United States Patent Office 3,165,224
Patented Jan. 12, 1965

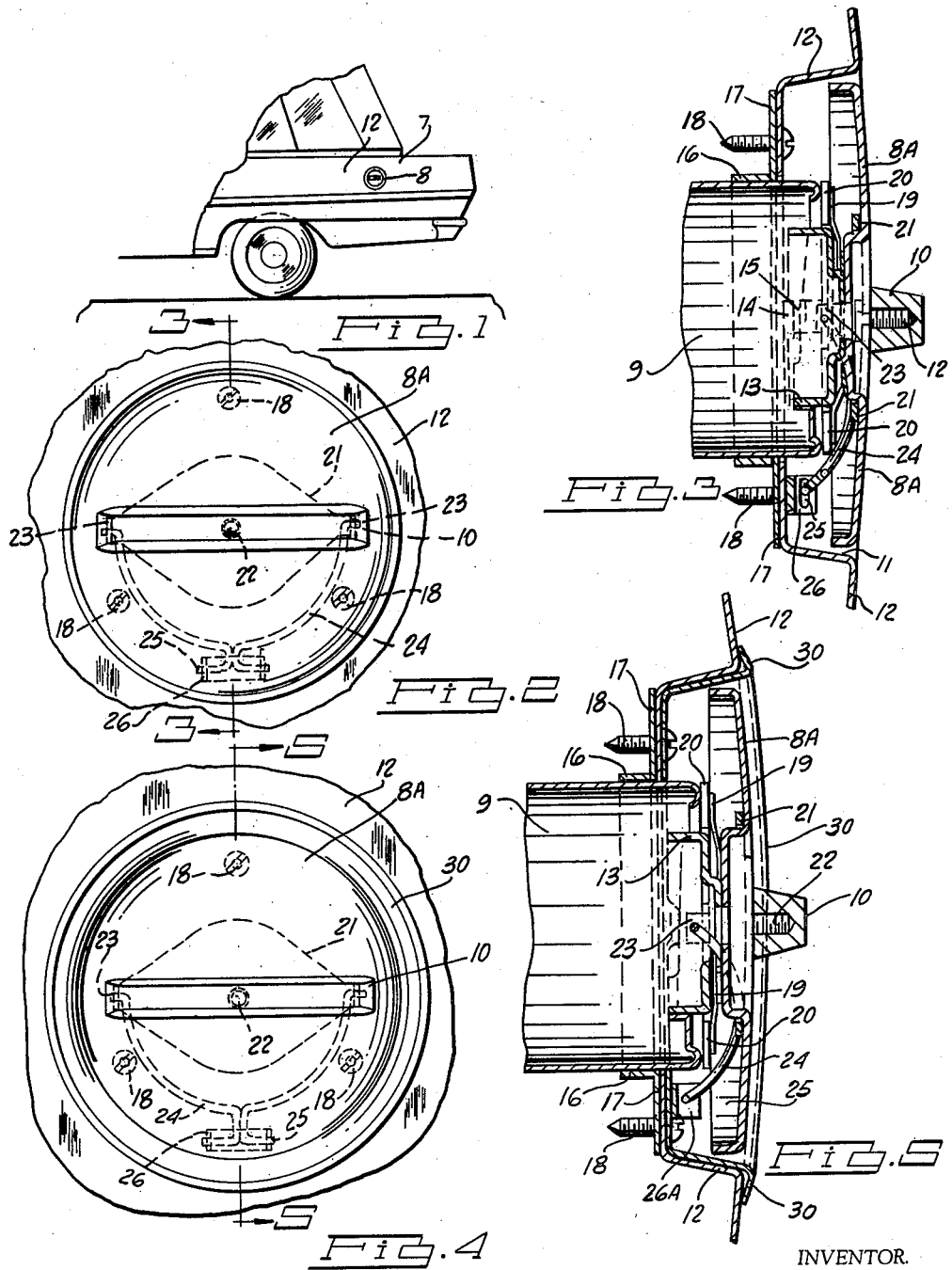

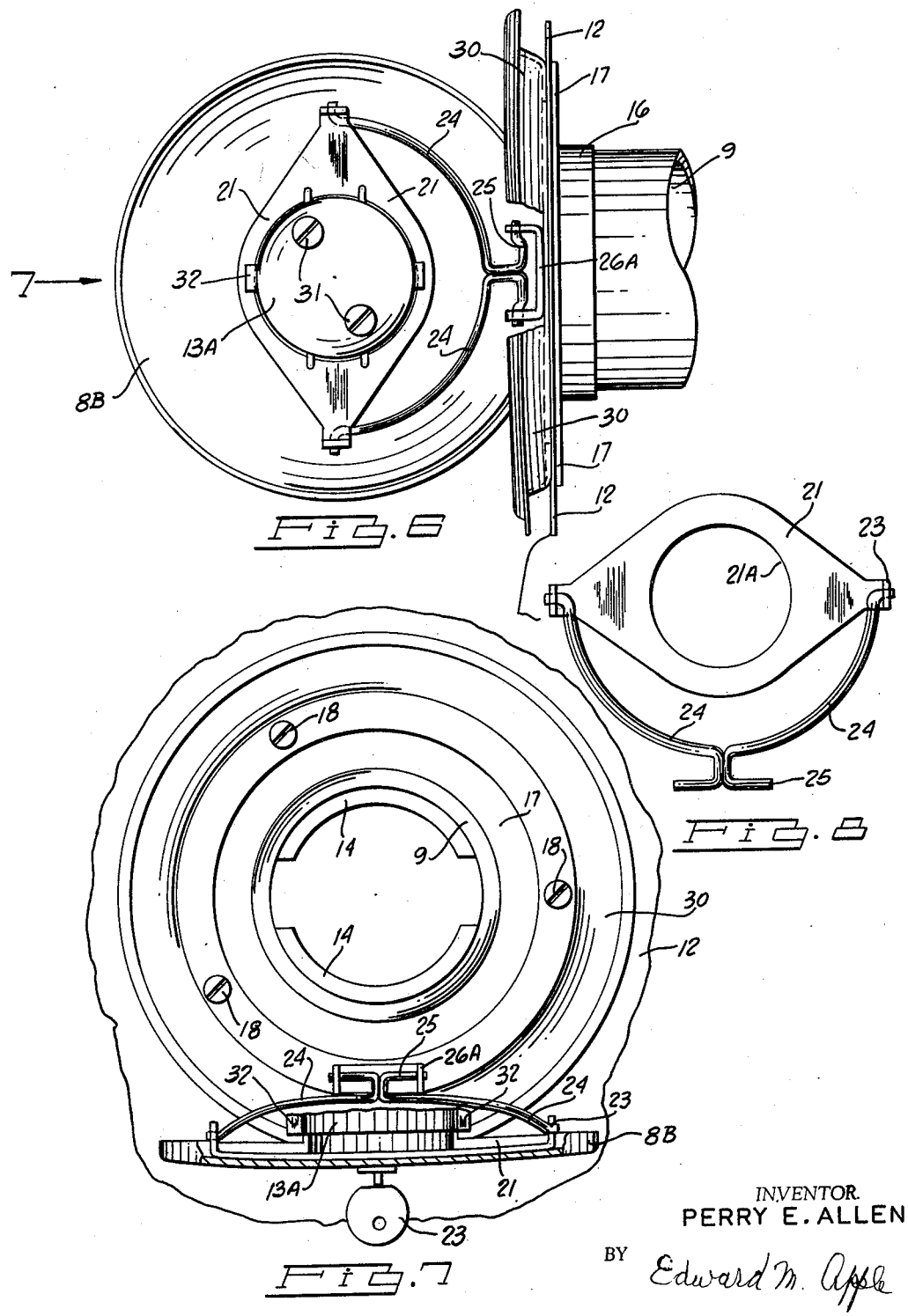

3,165,224
HINGED GASOLINE CAP
Perry E. Allen, 5644 Round Hill Road,
Birmingham, Mich.
Filed Dec. 19, 1962, Ser. No. 245,735
6 Claims. (Cl. 220—30.5)

This invention relates to automobile accessories and has particular reference to a cap for covering the gasoline tank filler pipe.

An object of the invention is to generally improve devices of the character indicated and to provide a gasoline tank cap which is integrated with the filler pipe and vehicle structure, so that it can not be knocked to the ground, lost, or misplaced by a gasoline station attendant, or be purloined by a child or prankster, or the like.

Another object of the invention is to adjustably anchor a gasoline tank cap so that it may readily be removed for filling the gasoline tank and held in an open position near the end of the filler pipe during the filling operation.

Another object of the invention is to provide a gasoline tank cap which is tethered to the vehicle in such a manner that it may be rotated about the axis of the filler pipe for locking and unlocking the cap and may be pivoted into an elevated position and held in that position during the filling of the gasoline tank.

Another object of the invention is to provide a gasoline tank cap which is mounted to the vehicle in such a manner that it will automatically position itself for rapid and easy closing of the filler pipe.

Another object of the invention is to provide a gasoline tank cap mounting means which may be employed with any gasoline tank cap, whether it be a conventional, rotate to lock, type or a key lock type of cap.

Another object of the invention is to provide a gasoline tank cap mounting means, which is constructed with an element for protecting the finish of the vehicle around the gasoline tank filler opening when the cap is elevated and the gasoline pump nozzle is received in or removed from the filler pipe opening.

The foregoing and other objects and advantages of the invention will become more apparent as the description proceeds, reference being made from time to time to the accompanying drawings forming a part of the within disclosure in which drawings:

FIG. 1 is a fragmentary elevational view of an automobile equipped with a device embodying the invention.

FIG. 2 is an enlarged fragmentary elevational view of the device shown in FIG. 1.

FIG. 3 is a section taken substantially on the line 3—3 of FIG. 2.

FIG. 4 is a view similar to FIG. 2 but showing a modified form of the invention incorporating a guard ring, which is intended to protect the finish of the motor vehicle around the gasoline filler opening when the gasoline pump nozzle is received in or removed from the filler tank opening.

FIG. 5 is a section taken substantially on the line 5—5 of FIG. 4.

FIG. 6 is an enlarged side elevational view of a further modified form of the device reversed from the view shown in FIG. 5, and illustrating the cap assembly when swung to the open position for filling the tank.

FIG. 7 is a plan view of the modified form of the device shown in FIGS. 4, 5 and 6, and illustrating the cap assembly in open position.

FIG. 8 is a detailed plan view of the yoke and arms for pivoting the cap assembly used in all modifications.

Referring now more particularly to the drawings, it will be understood that in the embodiment herein disclosed the reference character 7 indicates the rear deck of a motor vehicle which is equipped with a device embodying the invention. The device embodying the invention includes the conventional gasoline tank cap assembly 8 which in the embodiment shown in FIGS. 1, 2 and 3 is the conventional, rotate to lock and unlock type which is rotatable about the axis of the gasoline tank filler pipe (FIG. 3) by means of a hand grip 10. The cap assembly 8 includes a decorative chrome member 8A to which the hand grip 10 is secured, and to which is secured by a metal screw or the like a cup shaped member 13, the side walls of which telescope the outer end of the filler pipe 9. The cup like member 13 has a pair of outwardly extending ears 14 which are intended to lock under inwardly directed flange members 15 formed at the end of the filler pipe 9. The filler pipe 9 has welded to it a collar 16 which is formed with an integral flange 17 by which the filler pipe is secured to the quarter panel 12 by means of metal screws 18, or the like, which engage aligned bores formed in the members 12 and 17.

Between the member 8A and the cup like member 13 is a brass washer 19 which has a cross section as shown in FIG. 3 and has spring characteristics and is intended to exert pressure on the cork gasket 20 to seal the end of the pipe 9 against leakage of gasoline when the assembly is locked in place on the pipe 9.

The aforesaid elements are component parts of a conventional gasoline tank filler assembly and form no part of the invention except as combined with the other elements hereinafter described.

In order to practice my invention, I first separate the member 8A and the hand grip 10 from the cup like member 13 and insert a yoke member 21 and then replace the members 8A and 10 so that the yoke 21 rests against the inner face of the member 8A. The yoke member 21 (FIG. 8) has a central opening 21A for freely receiving the means, in this instance a machine screw 22, which connects the cup 13 to the members 8A and 10 so that the cap assembly 8 is free to rotate relative to the yoke 21. The yoke 21 is provided at each end with an apertured ear 23 in which apertures are received the ends of a pair of converging curved arms 24, which at the point of convergence are provided with fingers 25, which are received in apertures formed in a bracket 26 (FIG. 3) which is welded or otherwise secured to the member 12. This arrangement provides a double hinged structure, whereby the cap assembly 8 may be rocked into the position shown in FIGS. 6 and 7 so that the end of the filler pipe 9 is uncovered and a fuel hose nozzle may be inserted into the end of the pipe 9 to fill the gas tank. After sufficient fuel is placed in the tank, the cap assembly 8 is then rocked into place to close the end of the pipe 9 in which position the cup like member 13 will telescope the pipe 9. The cap assembly 8 can then be rotated as in conventional practice to lock the cap assembly 8 to the pipe 9.

In FIGS. 4 and 5 I illustrate a modified form of the device, which is similar to that shown in FIGS. 1 and 2, except that in this embodiment a protective member 30 is positioned on top of the flange 17 of the collar 16 and the overlapping portion of the body or fender member 12. The members 30, 12 and 17 are secured together by metal screws 18 as previously indicated. In this embodiment the bracket 26A, which pivots the arms 24, at one end, is welded to the protective member 30. Also in this embodiment it will be noted that the protective member 30 extends outwardly and over the edge of the recess or depression formed in the member 12. This protects the finish of the member 12 against damage by the insertion of the fuel hose nozzle into the pipe 9 when the cap assembly is in open position.

In FIGS. 6 and 7 I show a still further modified form of the invention. In this embodiment the protective member 30 is used as previously described but the cup shaped member 13A is attached to the cap assembly 8B by means of machine screws 31 and the cap assembly 8B is locked to the pipe 9 by means of spring backed locking detents 32, which are reciprocated by a key 33 as in conventional practice. The yoke 21 and its pivoting arms 24 are constructed and function the same as previously described to permit the cap assembly 8B to be rocked into open position for filling the tank.

It is believed that the operation of the device is obvious from the foregoing description.

Having described my invention what I claim and desire to secure by Letters Patent is:

1. The combination, with an automobile having a fuel tank, a filler pipe with inturned flanges at the outer end thereof and a rotatable cap assembly with means thereon for engaging said flanges to lock and unlock said cap upon rotation of said cap assembly, of a yoke having an opening therein for rotatably receiving an element of said cap assembly, apertured ears secured in spaced relation on said yoke, arms pivoted at one end in the apertures of said ears, and pivoted at the other end in a bracket secured to a member comprising part of the automobile body.

2. The structure of claim 1, in which the cap assembly includes an inverted cup-like element, which telescopes the end of said filler pipe and has outwardly directed flanges for engaging the inturned flanges on said pipe, and the cup-like element is rotatably secured to said yoke by means of an element which is received in the said opening in said yoke.

3. The structure of claim 1, in which said cap assembly is pivotable by means of said arms into a position which is parallel with the axis of said pipe.

4. The structure of claim 3, in which said cap assembly is pivotable by means of said arms, from its normal closed position, which is in a plane 90° from the vertical axis of said pipe, to an open position, which is in a plane parallel to the vertical axis of said pipe and spaced therefrom.

5. The structure of claim 1, in which said pipe has a flanged collar welded thereto, which said collar is secured to a body panel of said automobile, and the said bracket is secured in a position closely related to the securing point of said collar and said body panel.

6. The structure of claim 1, in which said pipe has a flanged collar welded thereto, which said collar is secured to a body panel of said automobile, and the said bracket is secured in a position closely related to the securing point of said collar and said body panel, there being a protective member underlying said bracket and overlying and secured to said flanged collar, and having a portion which extends outward from said collar and over the edge of the opening normally provided in said automobile, for receiving a fuel nozzle in said pipe.

References Cited in the file of this patent
UNITED STATES PATENTS

| | | |
|---|---|---|
| 1,909,554 | Stant | May 16, 1933 |
| 2,793,785 | Hunt | May 28, 1957 |